（12） United States Patent
Jeong et al.

(10) Patent No.: US 11,933,963 B2
(45) Date of Patent: *Mar. 19, 2024

(54) LIGHT TRANSMISSION BAND CHANGE UNIT, CAMERA MODULE, AND OPTICAL DEVICE

(71) Applicant: LG INNOTEK CO., LTD., Seoul (KR)

(72) Inventors: Yu Kyeong Jeong, Seoul (KR); Sung Phil Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/870,115

(22) Filed: Jul. 21, 2022

(65) Prior Publication Data

US 2022/0357570 A1 Nov. 10, 2022

Related U.S. Application Data

(63) Continuation of application No. 16/475,286, filed as application No. PCT/KR2018/000142 on Jan. 4, 2018, now Pat. No. 11,422,358.

(30) Foreign Application Priority Data

Jan. 4, 2017 (KR) .......................... 10-2017-0001547

(51) Int. Cl.
*G02B 26/00* (2006.01)
*G02B 5/20* (2006.01)
(Continued)

(52) U.S. Cl.
CPC ........... *G02B 26/007* (2013.01); *G02B 5/208* (2013.01); *H04N 23/54* (2023.01); *G06V 40/19* (2022.01)

(58) Field of Classification Search
CPC . G02B 7/00; G02B 26/00; G02B 5/20; G02B 5/05; G02B 5/208; G02B 26/007;
(Continued)

(56) References Cited

U.S. PATENT DOCUMENTS

| 7,156,564 | B2 | 1/2007 | Watanabe |
| 10,237,458 | B2 | 3/2019 | Lim |
| 11,422,358 | B2 * | 8/2022 | Jeong ..................... H04N 23/55 |

FOREIGN PATENT DOCUMENTS

| KR | 10-2012-0124875 | 11/2012 |
| KR | 10-2016-0036762 | 4/2016 |

(Continued)

OTHER PUBLICATIONS

International Search Report dated Apr. 16, 2018 issued in Application No. PCT/KR2018/000142.
(Continued)

*Primary Examiner* — Jie Lei
(74) *Attorney, Agent, or Firm* — KED & Associates LLP

(57) ABSTRACT

The present embodiment relates to a light transmission band change unit comprising: a base including a first axis; a blade arranged on the base and including a body, which has a first hole having a lens and an infrared pass filter arranged therein, a second hole having an infrared cut filter arranged therein, and a third hole into which the first axis is inserted; a magnet arranged between the base and the blade; a core coupled with the base and having a coil arranged thereon; and a blade cover including an upper plate arranged on the blade so as to have a fourth hole formed at a position corresponding to the lens, wherein at least a portion of the lens is arranged within the fourth hole.

20 Claims, 4 Drawing Sheets

(51) Int. Cl.
  *H04N 5/225*   (2006.01)
  *H04N 23/54*   (2023.01)
  *G06V 40/19*   (2022.01)

(58) Field of Classification Search
  CPC ...... G02B 26/008; G02B 7/102; G02B 7/006;
        G02B 13/001; H04N 5/225; H04N
        5/2253; H04N 5/2254; H04N 5/52252;
        H04N 5/5232; H04N 23/54; H04N 5/232;
        G06K 9/00; G06K 9/00604; G06V 40/19;
        G03B 9/08; G03B 9/904
  USPC ........ 359/234, 233, 236, 308; 396/463, 469,
        396/452, 508
  See application file for complete search history.

(56)  References Cited

FOREIGN PATENT DOCUMENTS

| KR | 10-2016-0044122 | 4/2016 |
| KR | 10-1659395 | 9/2016 |
| KR | 10-2016-0125688 | 11/2016 |
| WO | WO 2016 148512 A1 | 9/2016 |

OTHER PUBLICATIONS

U.S. Office Action dated Nov. 12, 2021 issued in parent U.S. Appl. No. 16/475,286.

* cited by examiner

LIGHT TRANSMISSION BAND CHANGE UNIT, CAMERA MODULE, AND OPTICAL DEVICE

CROSS-REFERENCE TO RELATED APPLICATIONS

This application is a Continuation Application of U.S. patent application Ser. No. 16/475,286 filed Jul. 1, 2019, which is a U.S. National Stage Application under 35 U.S.C. § 371 of PCT Application No. PCT/KR2018/000142, filed Jan. 4, 2018, which claims priority to Korean Patent Application No. 10-2017-0001547, filed Jan. 4, 2017, whose entire disclosures are hereby incorporated by reference.

BACKGROUND

1. Field

The present embodiment relates to a light transmission band change unit, a camera module, and an optical device.

2. Background

The following description only provides background information for the present embodiment and does not describe the prior art.

As the spread of various mobile devices becomes more common and wireless Internet service becomes commercialized, demands of consumers related to mobile terminals have been diversified and various kinds of add-on devices have been installed in mobile terminals.

One of them is a camera module that takes pictures or videos of subjects. Furthermore, camera modules with iris recognition function for identity authentication are being developed for security clearance in addition to photographing functions Typical photographing comprises an infrared cut filter to output an image with visible light. On the other hand, iris recognition photographing comprises a blade lens for focusing infrared rays and an infrared pass filter to output infrared images.

Therefore, dual-camera modules, which combine camera modules for photographing and iris recognition functions, were used to utilize both general photographing and iris recognition functions.

However, there is a problem that the installation space and production cost of the dual camera module increase more than twice as compared with the general camera module.

Further, the conventional iris recognition camera module has a problem that the height of the camera module increases due to the blade lens and the infrared pass filter.

BRIEF DESCRIPTION OF THE DRAWINGS

The embodiments will be described in detail with reference to the following drawings in which like reference numerals refer to like elements wherein.

DETAILED DESCRIPTION

Figure 1:
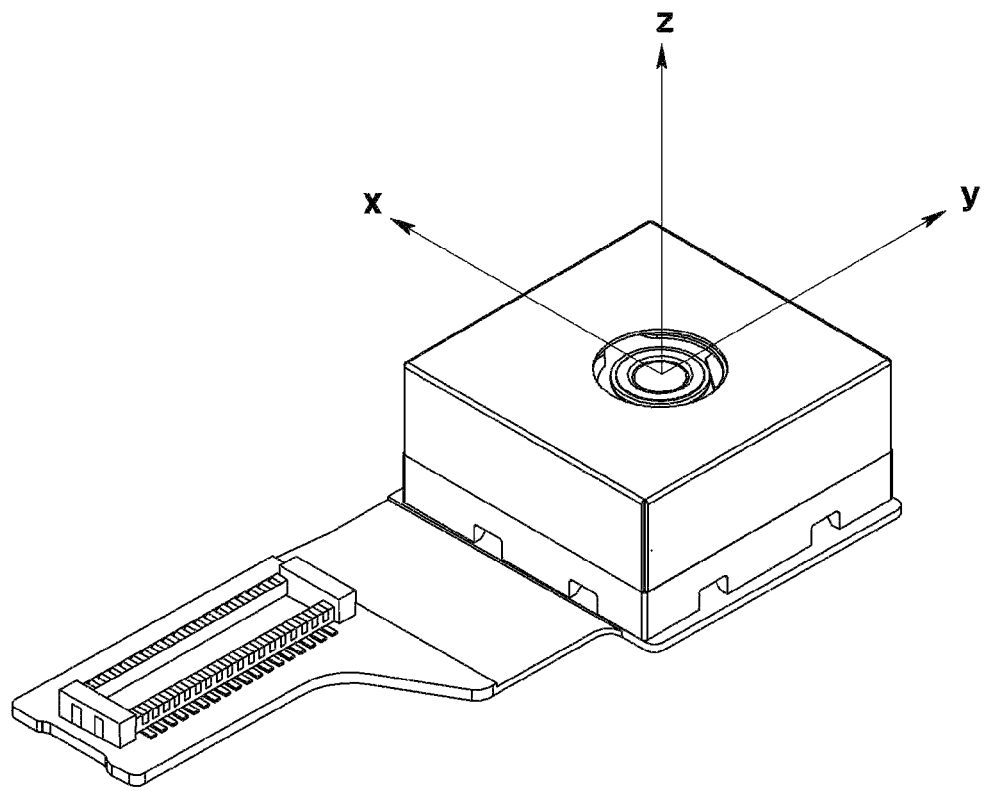
FIG. 1 is a perspective view of a camera module according to the present embodiment.

Hereinafter, some embodiments of the present invention will be described with reference to exemplary drawings. In describing the reference symbols of the components in the drawings, the same components are denoted by the same reference numerals whenever possible, even if they are shown on other drawings. In the following description of the embodiments of the present invention, a detailed description of known functions and configurations incorporated herein will be omitted when it may hinder the understanding of the embodiments of the present invention.

In describing the components of the embodiment of the present invention, terms such as first, second, A, B, (a), and (b) may be used. These terms are merely intended to distinguish the components from other components, and the terms do not limit the nature, order or sequence of the components. When a component is described as being "connected," "coupled," or "jointed" to another component, the component may be directly connected, coupled, or jointed to the other component, however, it should be understood that another element may be "connected," "coupled" or "jointed" between components.

Hereinafter, the "front-to-rear" direction is defined as the x-axis direction of the drawing. In this case, the arrow on the x-axis indicates forward direction. The "left-to-right" direction is defined as the y-axis direction of the drawing. In this case, the arrow on the y-axis indicates the right side. The "up-and-down" direction is defined as the z-axis direction of the drawing. In this case, the arrow on the z-axis indicates upward direction. The "optical axis direction" is defined as the optical axis direction of the lens module. Meanwhile, the "optical axis direction" may be mixedly used in combination with the up-and-down direction, the z-axis direction.

Hereinafter, an optical device according to the present embodiment will be described.

The optical device may be a hand phone, a mobile phone, a smart phone, a portable smart device, a digital camera, a laptop computer, a digital broadcasting terminal, a personal digital assistant (PDA), a portable multimedia player (PMP), a navigation device, and the like. However, the present invention is not limited thereto, and any device for photographing an image or a photograph is possible.

The optical device may comprise a main body (not shown), a display portion (not shown), and a camera module 1000.

The main body can form the appearance of the optical device. The main body may comprise, for example, a rectangular parallelepiped shape. However, the present invention is not limited thereto. As a modified embodiment, the main body may be rounded at least in part. The main body may accommodate the camera module 1000. A display unit may be disposed on one side of the main body.

The camera module 1000 may be disposed in the main body. The camera module 1000 may be disposed on one side of the main body. At least a part of the camera module 1000 may be accommodated inside the main body. The camera module 1000 can photograph an image of a subject.

The display unit may be disposed in the main body. The display unit may be disposed on one surface of the main body. That is, the display unit may be disposed on the same plane as the camera module 1000. Alternatively, the display portion may be disposed on a surface different from the one surface of the main body. The display unit may be disposed on a surface opposite to the surface where the camera module 1000 is disposed. The display unit can output the image photographed by the camera module 1000.

Figure 2:
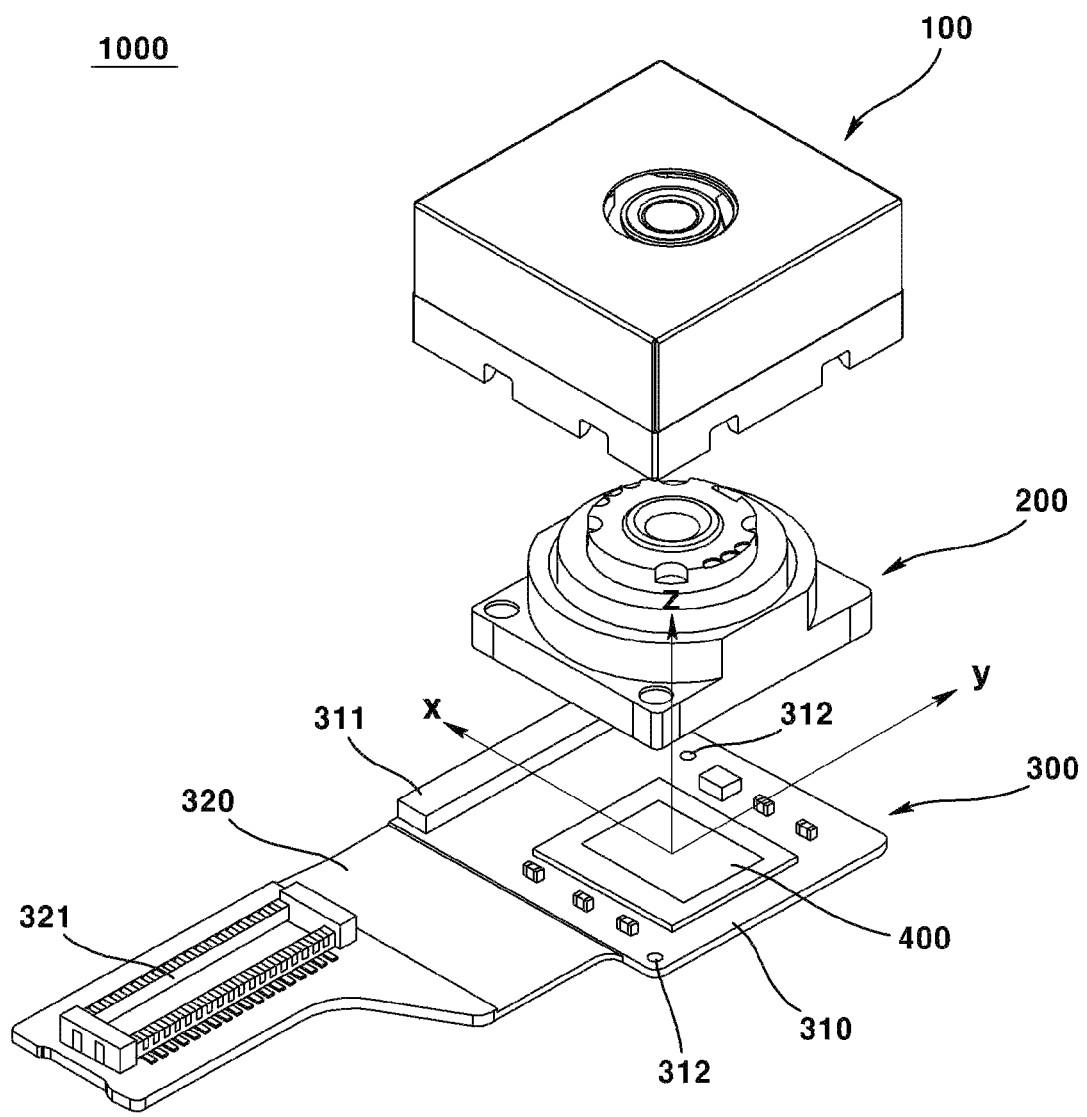
FIG. 2 is an exploded perspective view of the camera module according to the present embodiment.
Figure 3:
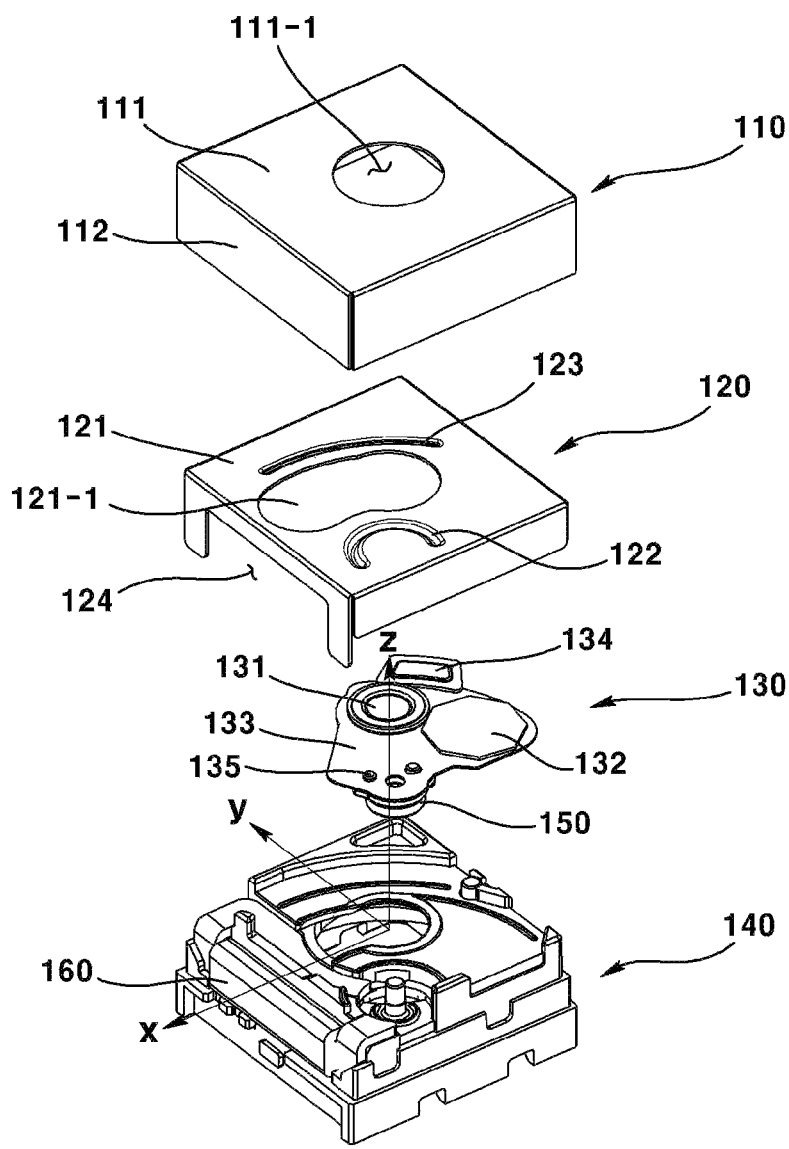
FIG. 3 is an exploded perspective view of the switching unit according to the present embodiment.
Figure 4:
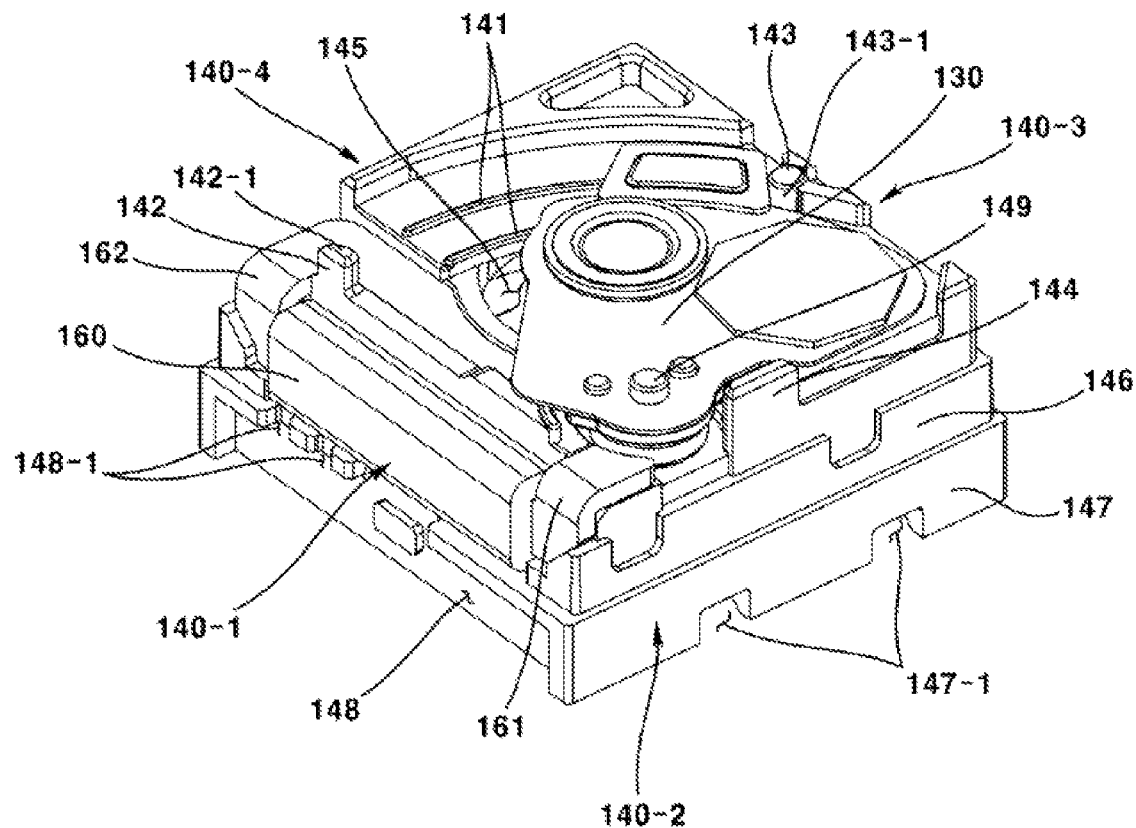
FIG. 4 is a perspective view of the switching unit in which the cover member and the pressing member are removed according to the embodiment.
Figure 5:
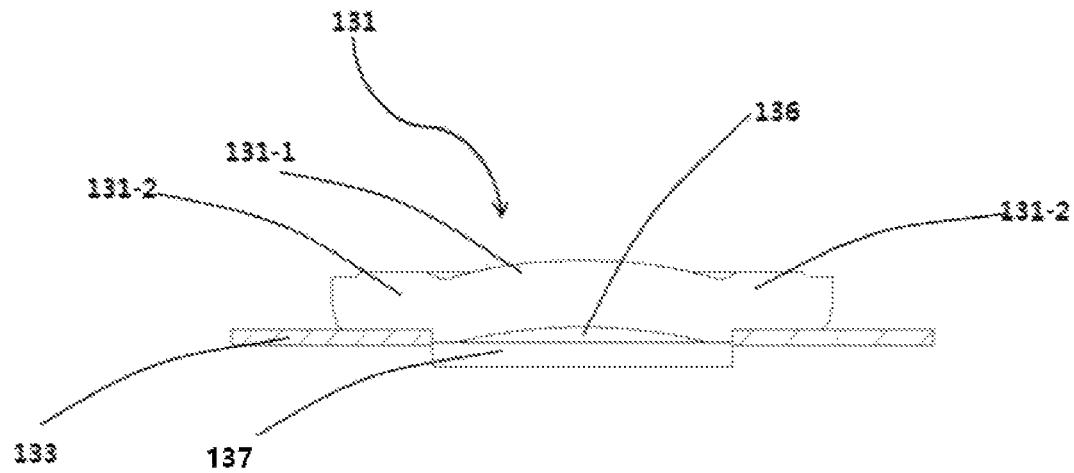
FIG. 5 is a cross-sectional view showing that the blade lens and the infrared pass filter according to the present embodiment are disposed in the first hole of the blade.

Hereinafter, the camera module of this embodiment will be described with reference to the drawings. FIG. 1 is a perspective view of a camera module according to the present embodiment; FIG. 2 is an exploded perspective view of the camera module according to the present embodiment; FIG. 3 is an exploded perspective view of the light transmission band change unit according to the present embodiment, FIG. 4 is a perspective view of the light transmission band change unit in which the cover member and the blade cover according to the present embodiment are removed; and FIG. 5 is a cross-sectional view showing that the blade lens and the infrared pass filter according to the present embodiment are disposed in the first hole of the blade. In interpreting the drawings, it should be noted that the direction in which the light transmission band change unit is viewed in FIGS. 3 and 4 is the direction in which the camera module is viewed in FIGS. 1 and 2 is rotated 90 degrees clockwise around the z axis.

The camera module 1000 according to the present embodiment may comprise a light transmission band change unit 100, a lens unit 200, a board unit 300, an image sensor 400, and a control unit (not shown).

The light transmission band change unit 100 may be disposed at an upper portion of the camera module 1000.

The light transmission band change unit 100 switches a blade lens 131 and the infrared cut filter 132 on the optical axis so that the camera module 1000 can perform infrared photographing for the iris recognition function and the visible light photographing for general photographing. The light transmission band change unit 100 may comprise a shield member 110, a blade cover 120, a blade 130, a base 140, and first and second driving members 150 and 160.

The shield member 110 may be an exterior material of the camera module 1000. The shield member 110 may comprise a top plate 111 and a side plate 112 extending downward from the top plate 111, and the bottom portion thereof may be open. Therefore, the shield member 110 may have an internal space. The blade cover 120, the blade 130, the base 140, and a first and a second driving members 150 and 160 may be accommodated in the shield member 110. The top plate 111 of the shield member 110 may be formed with a shield member hole 111-1 aligned with the optical axis. The light reflected by the subject can be received inside the camera module 1000 through the shield member hole 111-1. The lower end of the side plate 112 of the shield member 110 may be coupled with a base 140 which will be described later. The side plate 112 of the shield member 110 may be fixedly coupled to the upper end of a second step portion 147 of the base 140. That is, the shield member 110 can be supported by the base 140. In this case, the shield member 110 and the base 140 may be adhered to each other by an adhesive or may be fixed together by forceable fitting.

The shield member 110 may be formed of a metal material. More specifically, the shield member 110 may be formed of a metal plate. In this case, the shield member 110 may block electromagnetic interference (EMI). The shield member 110 can prevent the radio waves generated outside from being introduced into the inner side of the shield member 110. Also, the shield member 110 can prevent the radio waves generated inside the shield member 110 from being emitted to the outside of the shield member 110. However, the material of the shield member 110 is not limited thereto.

The blade cover 120 may be accommodated in the shield member 110. The blade cover 120 may be disposed above the blade 130. The blade cover 120 guides the blade 130 so as not to press or separate, thereby enabling the blade 130 to perform accurate pivot driving.

The blade cover 120 may comprise a rectangular upper plate 121 and side plates extending downward from the respective sides of the upper plate 121.

A blade cover hole 121-1 may be formed in the upper plate 121 of the blade cover 120 to correspond to a pivot driving path of the blade lens 131 which will be described later. The blade cover hole 121-1 may be referred to as "hole" and may be referred to as "fourth hole" in the claims. The blade cover hole 121-1 is a hole provided to efficiently press the blade 130 without blocking pivot driving of the blade 130. The blade cover hole 121-1 can provide the optical path of the light irradiated by the camera module 100. That is, the light that has passed through the shield member hole 111-1 can sequentially pass through the blade cover hole 121-1. At least a part of the blade lens 131 may be disposed in the blade cover hole 121-1. At least a part of the blade lens 131 can be accommodated in the blade cover hole 121-1. That is, at least a part of the blade lens 131 may overlap with the upper plate 121 of the blade cover 120 having the blade cover hole 121-1 in the horizontal direction (direction perpendicular to the optical axis of the lens). The blade lens 131 can move only within the blade cover hole 121-1. Therefore, the movable area of the blade lens 131 can be determined by the size of the blade cover hole 121-1. However, the size of the blade cover hole 121-1 may be larger than the area where the blade lens 131 of the blade 130 can move. The blade cover hole 121-1 of the upper plate 121 of the blade cover 120 may be formed to have a size larger than the movable range of the blade lens 131 with respect to a pivot shaft member 149.

The blade lens 131 may be protruded from the upper surface of the main body 133 of the blade 130. At this time, the protruding portion of the blade lens 131 can be inserted into the blade cover hole 121-1 of the blade cover 120. At least a part of the outer circumferential surface of the blade lens 131 can be in contact with the inner circumferential surface of the blade cover 120 forming the blade cover hole 121-1. The movement of the blade lens 131 can be guided by the contact between the outer circumferential surface of the blade lens 131 and the inner circumferential surface of the blade cover 120.

A blade cover protrusions 122 and 123 may be formed on the upper plate 121 of the blade cover 120 and the blade cover protrusions may comprise a first blade cover protrusion 122 and a second blade cover protrusion 123. Each of the first and second blade cover protrusions 122 and 123 may be referred to as a "protrusion". At this time, any one of them may be referred to as a "first protrusion" and the other one may be referred to as a "second protrusion" in order to distinguish the first and second blade cover protrusions 122 and 123. The blade cover 120 may comprise blade cover protrusions 122 and 123 protruding from one side of the blade cover 120 and contacting the blade 130. At this time, the blade cover protrusions 122 and 123 may be formed integrally with the upper plate 121 of the blade cover 120. The blade cover protrusions 122 and 123 may be formed by bending the upper plate 121 of the blade cover 120. The blade cover protrusions 122 and 123 may be formed as the top plate 121 of the blade cover 120 is downwardly protruded. Therefore, grooves may be formed on the blade cover protrusions 122 and 123 on the upper surface of the blade cover 120. The blade cover hole 121-1 may be positioned between the first blade cover protrusion 122 and the second blade cover protrusion 123. The blade cover protrusions 122 and 123 may be formed to be protruded downward along the pivot direction about the pivot shaft of the blade 130. The blade cover protrusions 122 and 123 may be in the form of a half arc or a circular arc around a pivot shaft. The blade cover protrusions 122 and 123 can perform a function of pressing or guiding the upper surface of the blade 130 or the main body 133 of the blade which will be described later. The first blade cover protrusion 122 may be in contact with the first driving member protrusion 135 protruding from the first driving member 150 and passing through the blade 130, which will be described later. The side of the first blade cover protrusion 122 may be in contact with the side of the first drive member protrusion 135 of the blade 130 which will be described later to perform the function of guiding pivot driving of the blade 130. The second blade cover protrusion 123 may be disposed radially outward of the first blade cover protrusion 122 about the pivot shaft of the blade 130. The second blade cover protrusion 123 may be protruded downward along the pivot direction. The second blade cover protrusion 123 may be in the form of a fan-shaped arc or a half arc. In this case, the rotation angle of the second blade cover protrusion 123 is 40 degrees or more and 80 degrees or less. The second blade cover protrusion 123 can perform the function of pressing the upper surface of the metal plate 134 of the blade 130 which will be described later. The second blade cover protrusion 123 can perform the function of supporting or guiding pivot driving of the blade 130 by contacting the metal plate 134 or a protruding surface of the metal plate 134. The blade 130 may comprise a metal plate 134 disposed on one surface of the main body 133. At least a portion of the metal plate 134 may be protruded towards the outside of the main body 133. More specifically, the metal plate 134 may be protruded towards the opposite side of the third hole through which the pivot shaft member 149 penetrates with respect to the blade lens 131.

The first blade cover protrusion 122, the blade cover hole 121-1 and the second blade cover protrusion 123 of the blade cover 120 can be radially disposed with respect to the center of the pivot shaft. In this case, the first blade cover protrusion 122, the blade cover hole 121-1, and the second blade cover protrusion 123 may be sequentially and radially disposed from the inner side towards the outer side when the pivot shaft is viewed as the center of the inner side.

The lower end of the side plate of the blade cover 120 can be coupled with the base 140 which will be described later. The lower end of the side plate of the blade cover 120 may be fixedly coupled to the upper end of a first step portion 146 of the base 140 which will be described later. That is, the blade cover 120 can be supported by the base 140. In this case, the blade cover 120 and the base 140 may be bonded by an adhesive. However, a core on which the second driving member 160 or the coil is disposed may be mounted on a first side surface 140-1 of the base 140. To accommodate the second driving member 160, a second driving member accommodating hole 124 may be formed in the side plate of the blade cover 120. Accordingly, when the blade cover 120 and the base 140 are coupled, the second driving member 160 can be disposed in the second driving member accommodating hole 124.

The blade 130 may be a member pivotally driven so that the blade lens 131 and the infrared cut filter 132 on the optical axis to be switched to each other.

The blade 130 may comprise a blade lens 131, an infrared cut filter 132, a main body 133, and a metal plate 134. The main body 133 may be referred to as a "body".

The blade 130 may be formed with a first hole 136 in which the blade lens 131 and the infrared pass filter 135 are disposed, a second hole in which the infrared cut filter 132 is disposed, and a third hole through which a pivot shaft member 149 is penetrating. The blade lens 131 may be referred to as a "lens".

The blade lens 131 and the infrared cut filter 132 may be disposed on the blade 130. The blade lens 131 and the infrared cut filter 132 may be disposed outside of the main body 133 in the radial direction around the pivot shaft. In this case, the blade lens 131 and the infrared cut filter 132 may be successively disposed in the clockwise or counterclockwise direction. In the camera module 1000 of the present embodiment, the blade 130 is pivotally driven so that the blade lens 131 can be positioned on the optical axis in infrared photographing mode for iris recognition or the like, in general photographing mode for visible light photographing, the infrared cut filter 132 may be positioned on the optical axis. In the camera module 1000 of the present embodiment, an infrared ray is used to output an image in infrared recognition mode, and an image can be output using a visible light in general photographing mode.

The blade lens 131 may be a lens for focusing infrared rays. Since the visible ray and the infrared ray have different refractive indices, the position to be focused may be different depending on the wavelength band. Therefore, in the camera module 1000 of the present embodiment, a separate blade lens 131 is provided so that the focusing position with respect to incident light in the infrared wavelength band can be corrected.

Hereinafter, with reference to FIG. 5, a description will be given for a case in which the blade lens 131 is disposed in the first hole 136. The blade lens 131 may comprise a spherical portion 131-1 and a flange portion 131-2. The spherical portion 131-1 may have a dome shape as a portion where the lens surface is formed. The flange portion 131-2 may be a portion extending radially outward from the edge of the spherical portion 131-1. The lower portion of the spherical portion 131-1 of the blade lens 131 can be accommodated in the upper portion of the first hole 136. In this case, the outer side surface of the lower portion of the spherical portion 131-1 may be in contact with the inner side surface of the first hole 136. The lower surface of the flange 131-2 can be in contact with the upper surface of the main body 133 to support the blade lens 131. The outer side surface of the lower portion of the spherical portion 131-1 and the inner side surface of the first hole 136 may be adhered. Therefore, the blade lens 131 can be fixed to the main body 133 of the blade 130.

The infrared pass filter 135 may be accommodated in the lower portion of the first hole 136. In this case, only the upper portion of the infrared pass filter 135 can be accommodated in the lower portion of the first hole 136. The infrared pass filter 135 may be disposed below the spherical portion 131-1 of the blade lens 131. The upper surface of the infrared pass filter 135 can be in contact with the lower surface of the lower portion of the spherical portion 131-1. The outer side surface of the infrared pass filter 135 can be in contact with the inner side surface of the first hole 136. The outer side surface of the infrared pass filter 135 and the inner side surface of the first hole 136 may be adhered to each other. Therefore, the infrared pass filter 135 can be fixed to the main body 133 of the blade 130.

In the modified embodiment, the infrared transmitting material may be coated on the blade lens 131. An infrared pass filter may be disposed on the upper or lower portion of the blade lens 131. The infrared transmitting material is an infrared band-pass filter which can transmit infrared light or infrared light among the light incident from the outside.

An infrared pass filter 225 may be deposited or coated by a vapor deposition method. For example, it can be manufactured by vapor-depositing an infrared transmitting material on the surface of a curvature portion 211.

In the infrared recognition mode, the blade 130 can be pivotally driven clockwise or counterclockwise. Therefore, the blade lens 131 can be positioned on the optical axis of the lens unit 200, which will be described later. As a result, the infrared rays can be focused on the image sensor 400 and irradiated.

The infrared cut filter 132 may be disposed in the second hole of the blade 130, and may be formed of a film material or a glass material. The infrared cut filter 132 may be formed by coating an infrared cut-off coating material on a plate-shaped optical filter such as a cover glass for protecting an image pickup surface and a cover glass. In this case, a vapor deposition method may be used.

In the normal photographing mode, the blade 130 can be pivotally driven counterclockwise or clockwise. Therefore, the infrared cut filter 132 may be positioned on the optical axis of the lens unit 200, which will be described later. As a result, visible light can be focused on the image sensor 400 and irradiated.

The main body 133 may be a support member or an exterior member of the blade 130. The main body 133 may be provided with a blade lens 131 disposed in the first hole 136 which is described above and an infrared cut filter 132 disposed in the second hole. And the pivot shaft member 149, which will be described later, may penetrate through the third hole. One end of the main body 133 may be pivotally supported and coupled to a pivot shaft member 141 of the base 140, which will be described later. The blade lens 131 and the infrared cut filter 132 may be disposed outside the radial direction with respect to the center of the pivot shaft of the main body 133 to which the pivot shaft member 141 is coupled. In this case, the blade lens 131 and the infrared cut filter 132 may be disposed along the pivot driving direction (circumferential direction). In addition, the blade lens 131 and the infrared cut filter 132 may be successively disposed in the clockwise or counterclockwise direction. As a result, when the blade 130 is pivotally driven in the clockwise direction, the blade lens 131 can be disposed on the optical axis of the lens unit 200 (see FIG. 4), and when the blade 130 pivotally rotates counterclockwise, the infrared cut filter 132 may be disposed on the optical axis of the lens unit 200.

The first driving member 150 may be disposed at a position corresponding to the pivot shaft at the lower portion (lower surface) of the main body 133. The first driving member 150 may be a magnet or comprise a magnet material. Accordingly, the first driving member 150 may be referred to as a "magnet". The first driving member 150 may be disposed below or above the main body 133 so as to surround at least a part of the pivot shaft member 149, which will be described later. The first driving member 150 may have a circular shape or a donut shape. The first driving member 150 may also comprise a coupling member for coupling with the blade 130. One side of the coupling member can be coupled with the first driving member 149 and the other side can be coupled with the blade 130. The coupling member may comprise a protrusion to be inserted into the hole formed in the blade. As a result, a first driving member projection 135 can be formed. That is, the first driving member protruding portion 135 may be a protruding portion of the main body 133 or a protruding portion of the coupling member. The coupling member may be integrally formed with the first driving member 149. The main body 133 and the first driving member 150 can be coupled with each other at a lower portion of the main body 133. As a result, when the first driving member 150 is rotated by the electromagnetic interaction of the first driving member 150 and the second driving member 160, the main body 133 can be integrally pivotally driven with the first driving member 150.

The first driving member 150 may be provided with a coupling member comprising a pin for coupling the first driving member 150 to the blade. In this case, the pin portion of the coupling member may be a projecting portion (first driving member protruding portion, 135) of the coupling member described above. The main body 130 may be formed with a first driving member coupling hole for accommodating the pin. The first driving member coupling hole may be one or more accommodating spaces spaced from each other along the pivot driving direction (circumferential direction) with respect to the center of the pivot shaft in the main body 133. In this case, the first driving member coupling hole can be disposed adjacent to the pivot shaft. That is, the first driving member coupling hole can be disposed radially inward (inward direction of radius) from the blade lens 131 and the infrared cut filter 132. The projecting portion, first driving member projection portion 135, of the coupling member passing through the first driving member coupling hole can be guided by contacting with the blade cover projecting portion 122 of the blade cover 120 described above.

At the radially outer end of the main body 133, with respect to the center of the pivot shaft, a metal plate 134 may be disposed. The metal plate 134 may be formed to be closer to the blade lens 131 side than the infrared cut filter 132.

The metal plate 134 may be integrally formed with the main body 133. In addition, the main body 133 may be made of a plastic material and the metal plate 134 may be made of a metal material. The metal plate 134 may comprise a portion outwardly protruded from the main body 133. Therefore, at least a part of the metal plate 134 and the main body 133 may not overlap with each other in the vertical direction. This allows the metal plate 134 to maintain rigidity even when it comes in contact with or collision with the first stop member 142 or the second stop member 143, and the manufacturing tolerance may be smaller than that of plastic. Since the quality difference of the captured image in the case of lens may be larger than the planar filter according to the twisted or tilted shaft, accuracy and reliability can be improved by disposing the blade lens 131 on the optical axis of the lens unit 200, and also by forming the two stop members 142 and 143 with metal. The metal plate 134 may be positioned radially (in the direction of radius) at the outermost side in the blade 130. When the blade is pivotally driven, the metal plate 134 may serve as a stopper for stopping the infrared cut filter 132 or the blade lens 131 at a predetermined position by being in contact with the first stop member 142 or the second stop member 143. Therefore, since it is a portion that comes into contact with the stop members, it can be made of a metal material to enhance rigidity and reliability. The metal plate 134 may be radially (radially) outwardly extended. In this case, the center of the metal plate 134 may be protruded to form a convex portion. The convex portion of the metal plate 134 can be pressed by the protrusion of the blade cover 120 protruding from the inner side surface of the upper plate 111 of the blade cover 120. The convex portion of the metal plate 134 can be in contact with the second blade cover protrusion 123 to perform the function of guiding pivot driving of the blade 130. It is to be understood that the present invention is not limited thereto.

A guide protrusion (not shown) protruding downward may be formed on the lower surface of the metal plate 134. The guide protrusion of the metal plate 134 may be in contact with the base 140 which will be described later and may be disposed between guide rails 141 of the base 140 to guide pivot driving of the blade 130.

The metal plate 134 may be of a trapezoidal shape wherein the side on the radially outer side is shorter than the side on the radially inner side with respect to the pivot shaft. Therefore, the first obtuse angle groove and the second obtuse angle groove can be formed at the contact portion where the main body 133 and the metal plate 134 meet, along the pivot direction (circumferential direction). In this case, the first obtuse angle groove and the second obtuse angle groove can be successively spaced apart from each other in the clockwise direction. In the first obtuse angle, the angle between the first sideline connecting the radially outer line and the radially inner line of the metal plate 134 and the radially outermost outline of the main body 133 may be an obtuse angle. In addition, in the second obtuse angle groove, the angle formed by the second sideline connecting the radially outer line and the radially inner line of the metal plate 134 and the radially outermost outline of the main body 133 may be an obtuse angle. The first obtuse angle groove of the metal plate 134 can be in contact with the first stop member 142 of the base 140 which will be described later when the blade 130 is driven in the counterclockwise direction. The first obtuse angle groove of the metal plate 134 is in contact with a first curve portion 142-1 of the first stop member 142 of the base 140 which will be described later when the blade 130 is driven in the counterclockwise direction. Therefore, pivot driving of the blade 130 is stably stopped, and the infrared cut filter 132 is positioned on the optical axis. As a result, the camera module 1000 of the present embodiment can perform photographing in a general photographing mode. In this case, since the first obtuse angle groove has an obtuse angle, the reaction by the first stop member 142 can be minimized. The second obtuse angle groove of the metal plate 134 can be in contact with the second stop member 143 of the base 140 which will be described later when the blade 130 is driven in the clockwise direction. Therefore, pivot driving of the blade 130 is stably stopped, and the blade lens 131 is positioned on the optical axis. As a result, the camera module 1000 of the present embodiment can perform photographing in the infrared recognition mode. In this case, since the second obtuse angle groove has an obtuse angle, the reaction by the second stop member 143 can be minimized.

The base 140 may comprise an upper surface in the shape of a rectangle and a first, a second, a third, and a fourth side surfaces 140-1, 140-2, 140-3, and 140-4 extending downward from the respective sides of the upper surface and the upper surface. The first side surface 140-1 may be a side surface disposed in front of the base 140. The second side 140-2 may be a side surface disposed on the left side surface of the base 140. The third side surface 140-3 may be a side surface disposed on the rear side of the base 140. The fourth side surface 140-4 may be a side surface disposed on the right side of the base 140. A space may be formed in the base 140 by the upper surface of the base 140 and the first, the second, the third, and the fourth side surfaces 140-1, 140-2, 140-3, and 140-4. Inside the base 140, a lens unit 200 wherein a plurality of lenses is disposed with the optical axes thereof aligned may be disposed.

The board unit 300 may be disposed under the base 140. The base 140 may be supported by the board unit 300. The lower end of the base 140 and the upper surface of the board unit 300 can be bonded together by an adhesive.

A base hole 145 may be formed on the upper surface of the base 140 in alignment with the optical axis. The light that has successively passed through a shield member hole 111-1 and a blade cover hole 121-1 passes through the blade lens 131 or the infrared cut filter 132 and then passes through the base hole 145.

A pivot shaft member 149 may be formed on the inner side of the corner of the first and second side surfaces 140-1 and 140-2 on the upper surface of the base 140. The pivot shaft member 149 may be referred to as a "first axis". Or the pivot shaft formed by the pivot shaft member 149 may be referred to as a "first axis". The pivot shaft member 149 may be a member that becomes a pivot shaft of pivot driving of the blade 130. The pivot shaft member 149 can penetrate through the blade 130 and the first driving member 150. The blade 130 and the first driving member 150 can be coupled to the pivot shaft member 149. The blade 130 coupled with the pivot shaft member 149 can be pivotally driven by using the pivot shaft member 149 as the pivot shaft. The first driving member 150 can be accommodated on the upper surface of the base 140 along the circumference of the pivot shaft member 149 to form a space for accommodating the ring-shaped first driving member 150.

A guide rail 141 may be formed on the upper surface of the base 140 in the pivot driving direction (circumferential direction) of the blade 130. The guide rail 141 may be a protruding portion of radially spaced arc in the shape of a fan. The guide rails 141 may be plural. Pivot driving of the blade 130 can be guided by the guide rails 141.

A first, a second, and a third stop members 142, 143, and 144 may be formed on the base 140 in the shape of a protruded protrusion. The first stop member 142 may be referred to as a "first stop member". And the second stop member 143 may be referred to as a "second stop member". The third stop member 144 may be referred to as a "third stop member". Each of the first to third stop members 142, 143, and 144 may comprise protrusions that are protruded from one surface of the base 140. At this time, the protrusion can be in contact with one surface of the blade 130. The base 140 may comprise the first stop member 142 and the second stop member 143 that is in contact with the metal plate 134 when the blade 130 is moved. The second stop member 143 may have a metal material. The first stop member 142 and the second stop member 143 may be disposed opposite to each other with respect to the metal plate 134. With this structure, when the metal plate 134 moves to one side, the metal plate 134 and the first stop member 142 come into contact with each other, and when the metal plate 134 moves to the other side, the metal plate 134 and the second stop member 143 can be contacted. The second stop member 143 may be disposed to be closer to the infrared cut filter 132 than the first stop member 142 when the blade lens 131 is located on the optical axis of the image sensor 400. On the first side surface 140-1 of the base 140, a first stop member 142 in the form of a protrusion protruding upward to the right may be formed. The first stop member 142 can come into contact with the blade 130 to stably stop pivot driving. The first stop member 142 can stop pivot driving of the blade 130 in the counterclockwise direction. As a result, the infrared cut filter 132 may be located on the optical axis. A first curved portion 142-1 inwardly convexly curved may be formed on the inner side of the first stop member 142. The first obtuse angle groove formed by the main body 133 of the blade 130 and the metal plate 134 can be in contact with the first curved portion 142-1. In this case, the first curved portion 142-1 can be stably accommodated in the first obtuse angle groove by the obtuse angle of the first obtuse angle groove. As a result, the reaction force of the first stop member 142 on the blade 130 can be minimized.

A second stop member 143 in the form of a protrusion protruding upward may be formed at the center of the third side surface 140-3 of the base 140. The second stop member 143 can come into contact with the blade 130 to stably stop pivot driving. The second stop member 143 can stop the clockwise pivotal movement of the blade 130. As a result, the blade lens 131 can be positioned on the optical axis. The second curved portion 143-1 may be formed on the inner side of the second stop member 143 so as to be convexly curved inward. The second obtuse angle groove formed by the main body 133 of the blade 130 and the metal plate 134 can be in contact with the second curved portion 143-1. In this case, the second curved portion 143-1 can be stably accommodated in the second obtuse angle groove by the obtuse angle of the second obtuse angle groove. As a result, the reaction force of the second stop member 143 on the blade 130 can be minimized. The material of the second stop member 143 may comprise a metal. Accordingly, the second stop member 143 can stop the blade 130 more accurately than the first stop member 142. This is because the blade lens 131 for focusing the infrared light must be located on the optical axis more precisely than the infrared cut filter 132 for filtering the infrared light. The first stop member 142 and the second stop member 143 may be made of a plastic material and protruded from the top of the base 140 to be integrally formed with the base 140. At least one of the first stop member 142 and the second stop member 143 may be made of a metal material and may be formed separately from the base 140 and disposed on the base 140. For example, the second stop member 143 may be a member having a columnar shape of a metal, and may be coupled and disposed on the base 140.

A third stop member 144 in the form of a plate protruding upward can be formed at the center of the second side surface 140-2 of the base 140. The third stop member 144 can come into contact with the blade 130 to stably stop pivot driving. That is, the third stop member 144 can stably stop the blade 130 together with the second stop member 143 when the blade 130 is pivotally driven clockwise. As described above, the purpose of pivot driving of the blade 130 in the clockwise direction is for positioning the blade lens 131 on the optical axis for the infrared recognition mode, therefore more precise driving and stopping are required than in the normal photographing mode. Therefore, in the camera module 1000 of the present embodiment, the blade 130 and the lens modules of the lens unit 200 are accurately aligned by stopping the blades 130 by the two second and third stop members 143 and 144.

The first step portion 146 may be formed on the second, third, and fourth side surfaces 140-2, 140-3, and 140-4 of the base 140. The lower end of the blade cover 120 may be supported and coupled to the upper surface of the first step portion 146.

The second step portion 147 may be formed on the first, second, third, and fourth side surfaces 140-1, 140-2, 140-3, and 140-4 of the base 140. The second step portion 147 may be formed under the first step portion 146. In this case, the second step portion 147 may be formed such that at least a part thereof is protruded outward from the first step portion 146. The lower end of the cover member 110 may be supported and coupled to the upper surface of the second step portion 147.

A board holder 148 for accommodating a circuit element 311 comprising a driver IC which will be described later may be formed at a central portion and a lower end portion of the second step portion 147 located on the first side surface 140-1. When the board unit 300 and the base 140 are coupled, the circuit element 311 comprising the driver IC can be accommodated and fixed in the board holder 148. Lead wire guide grooves 148-1 for accommodating lead wires of the second driving member 160, which will be described later, may be formed at the upper end of the second step portion 147 located on the first side surface 140-1. The second driving member 160 is a core (not shown) with a coil and disposed with the coil, and may have two lead wires drawn out from both ends of the coil. Therefore, the lead wire guide grooves 148-1 may be two grooves formed adjacent to each other. Both ends of the core may be extended and disposed so as to face towards the first driving member 150.

A plurality of adhesive holes 147-1 may be formed at the lower end of the second step portion 147 located on the second, third, and fourth side surfaces 140-2, 140-3, and 140-4. When the board unit 300 and the base 140 are coupled, the adhesive can be supplied through the adhesive hole 147-1. As a result, the lower end of the base 140 and the upper surface of the board 300 can be bonded together.

The second driving member 160 may be disposed on the first side surface 140-1 of the base 140. The second driving member 160 may be disposed on the first side surface 140-1 instead of the first step portion 146, and the second step portion 147 may be disposed on the lower side of the second driving member 160.

The first driving member 150 may be disposed at a lower portion of the blade 130 so as to correspond to the pivot shaft. The first driving member 150 may be a magnet. That is, the first driving member 150 may be referred to as a "magnet". The first driving member 150 may be disposed on the lower surface of the body 133 so as to correspond to the pivot shaft. The first driving member 150 may be disposed at a lower portion of the blade 130 to surround the pivot shaft or at least a part of the pivot shaft. The first driving member 150 can be coupled with the main body 133. The first driving member 150 can be coupled to the main body 133 by a pin coupling method. To this end, the main body 133 may be provided with a first driving member coupling hole for accommodating the pin. First driving member coupling holes may be plural and may be formed so as not to be symmetrical to each other about the pivot shaft. When the permanent magnets are formed so as not to be symmetrical to each other with respect to the center of the pivot shaft, it is possible to eliminate confusion about the direction of the anodes (N pole and S pole) of the magnets. The first driving member 150 may be a ring-shaped magnet. The first driving member 150 may be a permanent magnet. The pivot shaft member 149 can be inserted into the first driving member 150. The pivot shaft member 149 may be inserted into the center hole of the first driving member 150. As a result, when the first driving member 150 and the second driving member 160 perform electromagnetic interaction, the pivot shaft member 149 can be rotated about the shaft.

The second driving member 160 may be disposed on the first side surface 140-1 of the base 140. The second step portion 147 may be disposed below the second driving member 160. The second driving member 160 may be a wound coil or a coil wound around the core disposed in the case. That is, the second driving member 160 may be an electromagnet. The second driving member 160 may be electrically connected to the board unit 300. To this end, the two lead wires drawn out from the coils of the second driving member 160 may extend to the board unit 300 through the lead wire guide grooves 148-1. The outgoing wires of the second driving member 160 may be soldered to the board unit 300. As a result, the second driving member 160 can be supplied with current through the board unit 300. In this case, the control unit can control the direction, intensity, wavelength, and the like of the current flowing through the second driving member 160. When a current flows through the second driving member 160, the second driving member 160 may electromagnetically interact with the first driving member 150 so as to rotate the first driving member 150.

First and second extended portions 161 and 162 not disposed with coils may be formed at both ends of the core of the second driving member 160 respectively so as to be extended and exposed to the outside of the case of the second driving member 160. In this case, the first extended portion 161 may extend upward along the corners of the first and second side surfaces 140-1 and 140-2, and may be formed curved rearwardly. As a result, the end of the first extended portion 161 can be disposed with a gap apart from the outer side surface of the first driving member 150. The second extended portion 162 may extend upward along the edges of the first and fourth side surfaces 140-1 and 140-4, be curved rearwardly, and be curved to the left. As a result, the end of the second extended portion 162 can be disposed with a gap apart from the outer side surface of the side portion of the first driving member 150. The efficiency of the electromagnetic interaction between the first driving member 150 and the second driving member 160 can be enhanced by the arrangement structure of the first and second extended portions 161 and 162.

The lens unit 200 may be disposed in the inner space of the light transmission band change unit 100. The lens unit 200 may be supported on the board unit 300. The lens unit 200 can be coupled to the board unit 300. In this case, the lower surface of the lens unit 200 and the upper surface of the board unit 300 can be in contact with each other. Further, the lens unit 200 and the board unit 300 can be bonded by an adhesive. The lens unit 200 may have a structure in which a lens module is mounted on a lens holder. In this case, the lens module may be in the form of at least one lens in which the optical axis is aligned, or at least one lens mounted in the lens barrel. The light transmitted through the light transmission band change unit 100 can be incident on the lens unit 200. The light transmitted through the lens module by the lens unit 200 may be irradiated to the image sensor 400.

The board unit 300 may comprise a main board 310 and a connection board 320.

The main board 310 may be a printed circuit board (PCB).

The main board 310 can support the lens unit 200. The main board 310 can be coupled to the lens unit 200. The main board 310 may have an alignment groove 312 for aligning the lens unit 200. An alignment protrusion may be formed on the bottom surface of the lens unit 200 at positions corresponding to the alignment groove 312. As a result, when the main board 310 and the lens unit 200 are coupled, alignment protrusion can be accommodated in the alignment groove 312 and aligned. The image sensor 400 may be mounted on the upper surface of the main board 310 in alignment with the optical axis. In this case, the lens unit 200 may be mounted on the main board 310 and the image sensor 400 may be accommodated in the space inside the lens unit 200. As a result, the light transmitted through the lens unit 200 can be irradiated to the image sensor 400.

The main board 310 can support the light transmission band change unit 100. The main board 310 can be coupled with the light transmission band change unit 100. The upper surface of the main board 310 can be coupled with the lower end of the base 140. In this case, the main board 310 and the lower end of the base 140 can be bonded with an adhesive. For this, an adhesive hole 147-1 for injecting an adhesive may be formed at the lower end of the base 140. In addition, the circuit element 311 comprising a driver IC may be disposed on the main board 310. As described above, a board holder 148 may be formed at the lower end of a front side surface 140-1 of the base 140, and a conductive pattern and/or a plurality of terminals may be accommodated in the board holder 148. A circuit element 311 comprising a driver IC can be accommodated in the board holder 148 when the main board 310 and the base 140 are coupled. At least one of the circuit elements 311 comprising the driver IC may be electrically connected to a plurality of electrode terminals disposed on the side surface of the base. The electrode terminal may be electrically connected to the coil. The main board 310 and the base 140 can be aligned and the base 140 can be stably supported on the main board 310. The lens unit 200 may be disposed inside the light transmission band change unit 100 on the main board 310.

The lens unit 200 is accommodated in the light transmission band change unit 100 on the main board 310 and the image sensor 400 can be accommodated in the lens unit 200. The lens unit 200 may have an outer appearance corresponding to the inner space of the base. The lens unit 200 may have an appearance having a step corresponding to the inner step of the base.

The connection board 320 may be a flexible printed circuit board (FPCB). The connection board 320 may be formed to extend from the left side of the main board 310 to the left side. A connection terminal unit 321 may be mounted on the connection board 320. The connection terminal unit 321 may be a terminal to be electrically connected to the optical device. The main board 310 may be electrically connected to the main board of the optical device through the connection board 320.

The image sensor 400 may be mounted on the board unit 300. The image sensor 400 may be mounted on the main board 310. The image sensor 400 may be positioned so as to be aligned with the optical axis of the lens module. Thereby, the image sensor 400 can acquire the light passing through the lens module. The image sensor 400 can output the irradiated light as an image. The image sensor 400 may be a charge coupled device (CCD), metal oxide semiconductor (MOS), CPD, and CID. However, the type of the image sensor 400 is not limited thereto.

The control unit may be mounted on the board unit 300. The control unit may be mounted on the main board 310. The control unit can control the second driving member 160. The control unit can control the intensity, direction, and wavelength of the current supplied to the second driving member 160. As a result, in the infrared recognition mode, the blade 130 can be pivotally driven clockwise to control the blade lens 131 to be positioned on the optical axis. In the normal photographing mode, the blade 130 can be pivotally driven counterclockwise to control the infrared cut filter 132 to be positioned on the optical axis.

In the above, to have been described as all the components that make up the embodiments of the present invention may operate in combination, or combined into one, but the invention is not necessarily limited to these examples. That is, if the object in the scope of the present invention, may be that all of the components are selectively operates in conjunction with more than one. In addition, terms such as "inclusive and", "is configured" or "have" described above is because, which means that unless there is a particular of stated that, the component can be embedded, except for the different components it should not be construed to further comprise other components. All terms, comprising technical and scientific terms, have the same meaning as commonly understood by one of ordinary skill in the art to which this invention belongs, unless otherwise defined. Commonly used terms, such as predefined terms, should be interpreted to be consistent with the contextual meanings of the related art, and are not be construed as ideal or excessively formalistic, unless expressly defined to the contrary.

The above description is only to those described as the technical idea of the present invention by way of example, those skilled in the art that various modifications, additions and substitutions will be possible without departing from the essential characteristics of the present invention. Accordingly, the disclosed invention embodiments is for illustrative and not intended to limit the technical idea of the present invention, not by such an embodiment is the technical scope of the present invention is not limited. The scope of protection of the invention is to be interpreted by the following claims, all spirits within a scope equivalent will be construed as comprised in the scope of the present invention.

An objective of the present embodiment is to provide an integrated camera module capable of performing both a photographing function and an iris recognition function. Another objective is to provide a camera module capable of reducing the height of the camera module. Yet another objective is to provide an optical device comprising such a camera module.

A light transmission band change unit according to the present embodiment comprises: a base comprising a first axis; a blade disposed on the base and comprising a body having a first hole through which a lens and an infrared pass filter are disposed, a second hole through which the infrared cut filter is disposed, and a third hole into which the first axis is inserted; a magnet disposed between the base and the blade; a core coupled to the base and having a coil disposed therein; and a blade cover disposed on the blade and comprising a top plate having a fourth hole at a position corresponding to the lens, and at least a part of the lens may be disposed in the fourth hole.

The size of the fourth hole may be larger than the movable region of the lens of the blade.

The base comprises a protrusion protruding from one surface of the base, and the protrusion can be in contact with one surface of the blade.

The blade cover may comprise a protrusion protruding from one surface of the blade cover and contacting the blade.

The protrusion of the blade cover may comprise a first protrusion and a second protrusion, and the fourth hole may be positioned between the first protrusion and the second protrusion.

The blade may comprise a metal plate disposed on one side of the body, and at least a part of the metal plate may be protruded outward from the body.

The base may comprise a first stop member and a second stop member that are in contact with the metal plate when the blade is moved, and the second stop member may have a metal material.

And the second stop member may be disposed to be closer to the infrared cut filter than the first stop member when the lens is located on the optical axis.

The light transmission band change unit according to the present embodiment may comprise a base comprising a first axis; a blade disposed on the base; a magnet disposed between the base and the blade; and a blade cover coupled to the base and having a hole formed therein, wherein the blade comprises a first region in which a lens and an infrared pass filter are disposed, a second region in which an infrared pass filter is disposed, and wherein the hole of the upper plate of the blade cover may be formed to have a size larger than a movable range of the lens with respect to the first axis.

A camera module according to the present embodiment may comprise: a light transmission band change unit; a lens unit accommodated in the light transmission band change unit; a board unit disposed below the light transmission band change unit and on which an image sensor is disposed; and a shield member for accommodating the light transmission band change unit, wherein the light transmission band change unit may comprise: a base comprising an aperture and a first axis; a blade disposed on the base and comprising a body having a first hole through which a lens and an infrared pass filter are disposed, a second hole through which the infrared cut filter is disposed, and a third hole into which the first axis is inserted; a magnet disposed between the base and the blade; a core coupled to the base and having a coil disposed therein; and a blade cover disposed on the blade and comprising a top plate having a fourth hole formed at a position corresponding to the lens, wherein the fourth hole is configured such that when the blade rotates about the first axis, and at least a part of the lens may be disposed in the fourth hole.

A light transmission band change unit according to the present embodiment may comprise a base comprising an upper portion comprising an opening and a pivot shaft projecting from the upper portion; a blade disposed on the base and comprising a first hole in which the blade lens and the infrared pass filter are disposed, a second hole in which the infrared cut filter is disposed, and a third hole through which the pivot shaft passes; a ring-shaped magnet disposed on the blade, the ring-shaped magnet passing through the pivot shaft; a core disposed at one side of the base and having a coil disposed therein; and a blade cover disposed on the blade and coupled with the base, wherein the upper portion of the blade cover may comprise a blade cover hole, and the blade cover hole may correspond to a moving region of the blade lens when the blade moves about the pivot shaft.

The blade lens may have a moving region in the blade cover hole.

The blade lens may overlap the blade cover hole in the optical axis direction.

The blade lens may be protruded higher than the infrared cut filter so that at least a part of the blade lens overlaps the upper plate of the blade cover in a direction perpendicular to the optical axis.

The upper surface of the base may comprise at least one base protrusion, and the base protrusion can be in contact with the lower surface of the blade.

A blade protrusion protruding downward from the inside of the blade cover to be in contact with the blade may be comprised.

The blade protrusion may comprise a first blade protrusion and a second blade protrusion, and the base hole may be disposed between the first blade protrusion and the second blade protrusion.

A metal plate disposed on the blade may further be comprised, and at least a portion of the metal plate may be protruded upward to be in contact with the blade protrusion.

At least a portion of the metal plate may be protruded to the outside of the blade, so that at least a part of the metal plate may not overlap with the blade in a vertical direction.

A first stop member and a second stop member protruding from an upper surface of the base may be comprised, and the first stop member and the second stop member may move in the direction of the pivot shaft to be in contact with the metal plate.

The second stop member may be made of a metal material and disposed closer to the infrared cut filter than the infrared pass filter.

A camera module according to the present embodiment may comprise a light transmission band change unit; a lens unit accommodated in the light transmission band change unit; a board unit disposed below the light transmission band change unit and on which an image sensor is disposed; and a shield member made of a metal for accommodating the light transmission band change unit, wherein the light transmission band change unit comprises: a base comprising an upper portion comprising an opening and a pivot shaft projecting from the upper portion; a blade disposed on the base and comprising a first hole in which the blade lens and the infrared pass filter are disposed, a second hole in which the infrared cut filter is disposed, and a third hole through which the pivot shaft penetrates; a ring-shaped magnet disposed on the blade, the ring-shaped magnet passing through the pivot shaft; a core disposed at one side of the base and having a coil disposed therein; and a blade cover disposed on the blade and coupled with the base, wherein the upper portion of the blade cover comprises a blade cover hole, and the blade cover hole may correspond to a moving region of the blade lens when the blade moves about the pivot shaft.

The optical device according to the present embodiment comprises a main body; a display unit disposed on one side of the main body; and a camera module electrically connected to the display unit, wherein the camera module comprises: a light transmission band change unit; a lens unit accommodated in the light transmission band change unit; a board unit disposed below the light transmission band change unit and on which an image sensor is disposed; and a shield member made of a metal for accommodating the light transmission band change unit, wherein the light transmission band change unit comprises: a base comprising an upper portion comprising an opening and a pivot shaft protruding from the upper portion; a blade disposed on the base and comprising a first hole in which the blade lens and the infrared pass filter are disposed, a second hole in which the infrared cut filter is disposed, and a third hole through which the pivot shaft is penetrating; a ring-shaped magnet disposed on the blade, the ring-shaped magnet through which the pivot shaft is penetrating; a core disposed at one side of the base and having a coil disposed therein; and a blade cover disposed on the blade and coupled with the base, the upper portion of the blade cover comprises a blade cover hole, and the blade cover hole may correspond to a moving region of the blade lens when the blade moves about the pivot shaft.

The camera module of the present embodiment may perform both the photographing function and the iris recognition function with a single camera module since the iris recognition lens and the infrared cut filter can be switched by the switching unit. Furthermore, since the infrared pass filter is coated on the iris recognition lens rather than as an independent component, the size of the camera module in the optical axis direction can be reduced. Further, since pivot driving can be accurately performed by the structure of the blade and the first and second stop members, the iris recognition lens and the infrared cut filter can be accurately positioned on the optical axis. Further, an optical device comprising the above described camera module is provided.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A light transmission band change unit comprising:
   a base having a first axis;
   a blade disposed on the base and comprising a body, which has a first hole having a lens and an infrared pass filter disposed therein, a second hole having an infrared cut filter disposed therein, and a third hole into which a pivot shaft is inserted such that the pivot shaft is aligned with the first axis;
   a magnet disposed between the base and the blade;
   a core coupled with the base and having a coil disposed thereon; and
   a blade cover comprising an upper plate having a fourth hole formed at a position corresponding to movement of the lens,
   wherein the blade is configured to rotate about the pivot shaft between a first position in which the lens is vertically aligned with an optical axis and a second position in which the infrared cut filter is vertically align with the optical axis, and wherein at least a portion of the lens is to overlap with the fourth hole when the blade is in the first position, when the blade is in the second position and when the blade is to move between the first position and the second position.

2. The light transmission band change unit according to claim 1, wherein a size of the fourth hole is larger than a movable region of the lens of the blade.

3. The light transmission band change unit according to claim 1, wherein the blade cover comprises a first protrusion having a first arc and a second protrusion having a second arc protruding from one surface of the blade cover and contacting the blade.

4. The light transmission band change unit according to claim 3, wherein the base comprises a third protrusion protruding from one surface of the base, and wherein the third protrusion is in contact with one surface of the blade.

5. The light transmission band change unit according to claim 4, wherein the radius of curvature of the second arc is larger than the radius of curvature of the first arc.

6. The light transmission band change unit according to claim 5, wherein the magnet comprises a fourth protrusion protruding from one surface of the magnet and passing through the blade,
wherein a side portion of the first protrusion is in contact with a side portion of the fourth protrusion to perform the function of guiding pivot driving of the blade.

7. The light transmission band change unit according to claim 6, wherein the fourth protrusion is disposed between the first axis and the first protrusion.

8. The light transmission band change unit according to claim 5, wherein the blade comprises a fourth protrusion protruding from one surface of the blade,
wherein a side portion of the first protrusion is in contact with a side portion of the fourth protrusion to perform the function of guiding pivot driving of the blade.

9. The light transmission band change unit according to claim 5, comprising a coupling member coupled with the magnet and the blade,
wherein the coupling member comprises a fourth protrusion protruding from one surface of the coupling member and passing through the blade,
wherein a side portion of the first protrusion is in contact with a side portion of the fourth protrusion to perform the function of guiding pivot driving of the blade.

10. The light transmission band change unit according to claim 3, wherein the blade comprises a metal plate disposed on one side of the body, and
wherein at least a portion of the metal plate is protruded to the outside of the body.

11. The light transmission band change unit according to claim 10, wherein the base comprises a first stop member and a second stop member that are in contact with the metal plate when the blade is moved, and
wherein the second stop member is made of a metal material.

12. The light transmission band change unit according to claim 11, wherein the second stop member is disposed closer to the infrared cut filter than the first stop member when the lens is vertically aligned with the optical axis.

13. The light transmission band change unit according to claim 11, wherein the base comprises a third stop member protruding from an upper surface of the base that is in contact with the blade.

14. The light transmission band change unit according to claim 13, wherein the body of the blade comprises groove formed at a side surface of the body that is in contact with the third stop member.

15. The light transmission band change unit according to claim 14, wherein the first protrusion and the second protrusion are protruded downward along a pivot direction about the first axis.

16. The light transmission band change unit according to claim 10, wherein the base comprises two third protrusions formed on an upper surface of the base and radially spaced, and
wherein the metal plate comprises a fifth protrusion protruding downward and disposed between two third protrusions to guide pivot driving of the blade.

17. The light transmission band change unit according to claim 3, wherein the first protrusion and the second protrusion are concentric.

18. The light transmission band change unit according to claim 3, wherein the fourth hole is disposed between the first protrusion and the second protrusion, and
wherein a radius of curvature of the first arc is different from a radius of curvature of the second arc.

19. A light transmission band change unit comprising:
a base having a first axis;
a blade disposed on the base;
a magnet disposed between the base and the blade; and
a blade cover coupled to the base and comprising an upper plate on which a hole is formed,
wherein the blade comprises a first region in which a lens and an infrared pass filter are disposed, a second region in which an infrared pass filter is disposed, and a body in which a hole into which a pivot shaft is inserted such that the pivot shaft is aligned with the first axis, and
wherein the hole of the upper plate is disposed between a first protrusion having a first arc and a second protrusion having a second arc, and
wherein a radius of curvature of the first arc is different from a radius of curvature of the second arc,
wherein the blade is configured to rotate about the pivot shaft between a first position in which the lens is vertically aligned with an optical axis and a second position in which the infrared cut filter is vertically align with the optical axis, and wherein at least a portion of the lens overlaps with the hole when the blade is in the first position, when the blade is in the second position and when the blade is to move between the first position and the second position.

20. A camera module comprising:
a light transmission band change unit;
a lens unit accommodated in the light transmission band change unit;
a board unit disposed below the light transmission band change unit and on which an image sensor is disposed; and
a shield member for accommodating the light transmission band change unit, wherein
the light transmission band change unit comprises:
a base comprising an aperture and having a first axis;
a blade disposed on the base and comprising a body having a first hole through which a lens and an infrared pass filter are disposed, a second hole in which an infrared cut filter is disposed, and a third hole into which a pivot shaft is inserted such that the pivot shaft is aligned with the first axis;
a magnet disposed between the base and the blade;
a core coupled to the base and having a coil disposed therein; and
a blade cover disposed on the blade and comprising an upper plate having a fourth hole at a position corresponding to an optical axis,
wherein the fourth hole is formed to correspond to a moving region of the lens of the blade when the blade is rotated about the first axis, and
wherein the blade is configured to rotate about the pivot shaft between a first position in which the lens is vertically aligned with the optical axis and a second position in which the infrared cut filter is vertically align with the optical axis, and wherein at least a portion of the lens overlaps with the fourth hole when the blade is in the first position, when the blade is in the second position and when the blade is to move between the first position and the second position.

* * * * *